United States Patent Office 3,491,092
Patented Jan. 20, 1970

---

3,491,092
SUBSTITUTED BENZOXAZINONES AND A PROCESS FOR THEIR PREPARATION
Ernst Grigat, Cologne-Stammheim, Rolf Putter, Duesseldorf, Karl Schneider, Burscheid, and Karlfried Wedemeyer, Cologne-Stammheim, Germany, assignors to Farbenfabriken Bayer Aktiengesellschaft, Leverkusen, Germany, a corporation of Germany
No Drawing. Continuation of application Ser. No. 407,223, Oct. 28, 1964. This application Dec. 8, 1967, Ser. No. 689,208
Claims priority, application Germany, Nov. 6, 1963, F 41,199; Nov. 8, 1963, F 41,232, F 41,234; Feb. 7, 1964, F 41,953; Apr. 20, 1964, F 42,669; June 30, 1964, F 43,302; July 1, 1964, F 43,316
Int. Cl. C07d 87/08; A01n 9/22
U.S. Cl. 260—244                                18 Claims

ABSTRACT OF THE DISCLOSURE

This invention is directed to certain 1,3 benzoxazine-4-ones. These compounds are useful as herbicides, fungicides, and insecticides. These compounds also increase the photographic speed of silver chloride emulsions and partly act as stabilizers and fog reducing agents in such emulsions.

---

CROSS-REFERENCE TO RELATED APPLICATION

This application is a continuation of application Ser. No. 407,223 filed Oct. 28, 1964, now abandoned.

The subject of the invention are benzoxazinones substituted in the 2-position and a process for their preparation. The benzoxazinones correspond to the general formula

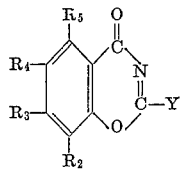

(I)

where $R_2$, $R_3$, $R_4$, $R_5$ denote hydrogen, halogen, if desired substituted alkyl- or aryl radicals, alkoxy-, aroxy-, acyloxy-, alkylmercapto-, arylmeracpto-, nitro-, cyano-, cyanate-, isocyanate-, alkylamino-, acylamino-, sulphamino-, sulphonic-, sulphonic-ester-, sulphonamide-, carboxy-carbalkoxy-, carbaroxy-, carbamino-, aldehydo-, acyl- and alkylbenzoxyazinonyl-radicals and in which two adjacent radicals $R_2$ to $R_5$ may together be a constituent of further aliphatic or aromatic ring systems, which may if desired contain heteroatoms, and in which, two adjacent radicals $R_2$ to $R_5$ may represent the group

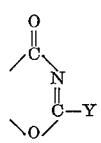

and Y represents —O—$R_6$,

or —S—$R_8$, where $R_6$ denotes an aromatic radical which may be substituted, $R_7$ denotes hydrogen, hydroxyl, an aliphatic, aromatic or heterocyclic radical which may be substituted or

$R_8$, $R_9$ and $R_{10}$ denote hydrogen, an aliphatic, aromatic or heterocyclic radical which may be substituted and $R_7$ and $R_8$ or $R_9$ and $R_{10}$ may together with the nitrogen atom or, if desired, with inclusion of further heteroatoms, form a heterocyclic ring.

Possible substituents for the aliphatic, aromatic and heterocyclic radicals in $R_6$ to $R_{10}$ are the groups and atoms mentioned in connection with $R_2$ to $R_5$.

It has been found that these benzoxazinones substituted in the 2-position are obtained when cyanic acid esters of the general formula

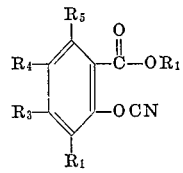

II in which $R_1$ denotes hydrogen, an aliphatic, aromatic or heterocyclic radical which may be substituted by halogen, alkyl-, phenyl-, alkoxy-, acyl-, mercapto-, nitro-, cyano-, amino-, alkylamino, acylamino-, carboxy-, carbalkoxy-, carbaroxy-, and sulphonic acid groups, $R_2$, $R_3$, $R_4$ and $R_5$ denote hydrogen, halogen (if desired, substituted) alkyl- or aryl radicals, alkoxy-, aroxy-, acyloxy-, alkylmercapto-, arylmercapto, nitro-, cyano-, cyanate-, isocyanate-, alkylamino-, acylamino-, sulphamino-, sulphonic-, sulphonic ester-, sulphonamido-, carboxy-, carbalkoxy-, carbaroxy-, carbamino-, aldehyde- and acyl radicals which may also be joined to a further radical of Formula II, and in which, two adjacent radicals $R_2$ to $R_5$ may be constituents of further aliphatic or aromatic rings systems which may contain hetero atoms in which one of two adjacent radicals $R_2$ to $R_5$ may denote —OCN and the other

are reacted with compounds of the formula HY where Y has the meaning given above, alone or in a liquid medium at temperatures of —50 to 180° C. preferably —20 to 130° C. It is also possible to isolate an intermediate compound of the general formula

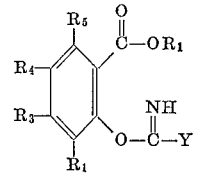

III if desired in the form of a salt such as hydrochloride, carbonate, acetate or sulphate, which is then converted into the compounds according to the invention of Formula I by treating it with a base such as NaOH, NaOCH$_3$, Na$_2$CO$_3$, triethylamine and/or heating it to temperatures up to 250° C. if desired, in a solvent.

o-Cyanato-carboxylic acid esters that can be used for the process according to the invention may be prepared according to our earlier applications from the corresponding o-hydroxycarboxylic acid esters by reaction with a halogen cyanide in a liquid medium, preferably below 65° C., in the presence of at least equivalent quantities of a base.

The following compounds may be as examples of suitable o-cyanato-carboxylic acid esters: 2-cyanatobenzoic acidphenyl ester, 2-cyanato-benzoic acid, 2'-chlorophenyl ester, the 2',4'- or 2':6'-dichlorophenyl esters of 2-cyanatobenzoic acid, the (2)-naphthyl ester of 2-cyanatobenzoic acid, the 2':6'-dichlorophenylester of 5-chloro-2-cyanatobenzoic acid, the phenyl ester of 3-methyl-2-cyanatobenzoic acid, the (2)-naphthyl ester of 4-methyl-2-cyanatobenzoic acid, the aryl esters of 3-nitro-2-cyanatobenzoic acid, the aryl esters of 5-chloro-3-methyl-2-cyanatobenzoic acid, the aryl esters of 5-tertiary butyl-2-cyanato-benzoic acid, the aryl esters of 3-methoxy-2-cyanatobenzoic acid, the (1:3)-diphenylester of 4-cyanatobenzendicarboxylic acid, the aryl esters of 2:5-dicyanato-1:4-benzene-dicarboxylic acid, the diphenylester of 5:5'-methylene-2:2'-dicyanato-disalicyclic acid, the (3)-aryl esters of 5:6:7:8-tetrahydro-2-cyanato-naphthalene carboxylic acid, the (2)-aryl ester of 1-cyanatonaphthoic acid, the (1)-aryl ester of 2-cyanatonaphthoic acid the (3)-aryl ester of 2-cyanatonaphthoic acid, the methyl ester of 2-cyanato-benzoic acid, the ethyl ester of 2-cyanato-benzoic acid, the isobutyl ester of 2-cyanato-benzoic acid, the amyl ester of 2-cyanato-benzoic acid, the methyl ester of 3-methyl-2-cyanato-benzoic acid, the amyl ester of 4-methyl-2-cyanatobenzoic acid, the propyl ester of 3-methoxy-2-cyanato-benzoic acid and the (1:3)-dimethyl ester of 4-cyanatobenzene-dicarboxylic acid.

The following compounds may be used as the compound HY:

Hydroxyl compounds (if desired in the form of their alkali- metal or alkaline earth metal salts), e.g. phenol, alkylphenols such as o-, m-, p-cresol, 2-,3-, 4-ethylphenol, -isopropyl-phenol, n-, iso-, tertiarybutylphenol, dodecylphenol, aryl-phenols such as hydroxydiphenyl, nitrophenols such as 2-, 3- or 4-nitrophenol, 4-nitro-3-methylphenol, halogenphenols such as 2-, 3- or 4-chloro-bromo- or fluoro-phenol, 2:3-, 2:4-, 2:5-, 2:6 3:4, 3:5-dichloro(dibromo)-phenol, alkoxy- and aroxyphenols such as 2-, 3- or 4-methoxy (phenoxy)- phenol, aryl- and alkymercaptophenols such as 2-, 3- or 4- methylmercapto(phenylmercapto)-phenol, alkyl- and acyl- aminophenols such as 2-, 3- or 4-dimethylaminophenol, 3-dimethylamino-4-methylphenol, 4-dimethylamino-3-methylphenol, 4-acetylaminophenol, acylphenols such as 2-, 3- or 4-hydroxyaceto(benzo)-phenol, phenolcarboxylic acid derivatives such as salicylic acid ester, -amide, phenol-sulphonic acids such as 2-acetoaminophenolsulphonic acid-(4)-dimethylamide, mixed substituted phenols such as 5-chloro-2-nitrophenol and 3-chloro-2-hydroxydiphenyl, hydroxy-naphthalene derivatives such as α-, β-naphthol, ar-tetrahydro-naphthol, 2-hydroxy-naphthoic acid-3-methyl ester, -phenyl ester and anilide, heterocyclic hydroxy compounds such as 5-hydroxy-quinoline, 5:7-dichloro-8-hydroxyquinoline, 2:3-dihydroxyquinoxaline, di- and polyhydroxyl compounds such as hydroquinone, 1:5-dihydroxynaphthalene, 2:2-bis-(4-hydroxyphenol)-propane.

Compounds containing —$NH_2$ or >NH-groups (if desired in the form of their salts such as hydrochlorides, sulphates, acetates, carbonates) such as: Ammonia, unsubstituted and substituted primary amines such as, for example, aniline, chloroaniline, p-aminobenzoic acid, sulphanilic acid, alkylaniline, nitroaniline, naphthylamine, 2-aminobenzthiazole, methylamine, ethylamine, isomylamine, cyclohexylamine, allylamine, benzylamine, aminoacetic acid β-alanine, γ-aminobutyric acid, methionine, lycine, β-aminoethane sulphonic acid, N:N-dimethylethylene diamine, unsubstituted and substituted secondary amine such as diethylamine, diallylamine, N-methylstearylamine, dibenzylamine, N-methylaniline; cyclic amines such as pyrrolidine, piperidine, morpholine, tetrahydroquinoline, decahydroquinoline, imidazole, benztriazole, benzpyrazole, bifunctional amines such as phenylenediamine, ethylenediamine, hexamethylenediamine, piperazine, N:N'-dimethylethylene diamine, p-aminobenzylamine.

Substances which contain hydrazine groups (if desired in the form of their salts such as hydrochlorides, sulphates, carbonates, acetates) such as: Hydrazine, methylhydrazine, isopropylhydrazine, N:N-dimethylhydrazine, phenylhydrazine, 2-, 3-, or 4-methylphenylhydrazine, 2- 3- or 4-nitrophenyl-hydrazine, 2:4-dinitrophenyl-hydrazine, 2:5-dichlorophenyl-hydrazine, diphenylhydrazine, N-aminopiperidine, N-aminomorpholine, benzaldehyde hydrazine, cyclohexanonehydrazine, N-aminocarbazole, 4-hydrazinopyridine.

Substances which contain hydroxylamine (if desired in the form of their salts such as hydrochlorides, sulphates, carbonates, acetates) such as: Hydroxylamine, N-ethylhydroxylamine, N-isoamylhydroxylamine, N-phenylhydroxylamine, 2-, 3- or 4-alkyl (such as methyl-, ethyl-, isopropyl-, tertiary butyl) phenyl hydroxylamine, 2-, 3- or 4-halogen (chloro-, bromo- fluoro-)-phenyl-hydroxylamine, 2-, 3- or 4-ethoxyphenyl-hydroxylamine, 3-nitrophenylhydroxylamine, N:N - dimethyl-3-hydroxylaminoaniline, 4-hydroxylaminobenzoic acid ester and 1-, 2-hydroxylamino-naphthalene.

Compounds which contain shulphhydryl groups (if desired in the form of their alkali metal or alkaline earth metal salts) such as hydrogen sulphide, methylmercaptan, ethylmercaptan, n-, iso-, tertiarybutylmercaptan, n-, isododecylmercaptan, 4-chloro-1-mercaptobutane, ethylmercaptoacetate, thiomalic acid, thioethylene lycol, cyclohexylmercaptan, thiophenol, thio-, o-, m-, p-cresol, 4-tertiary butyl-thiophenol, 4-bromothiophenol, pentachlorothiophenol, 2:4-dinitrothiophenol, 5-nitro-1-mercaptobenzophenone, 4-ethoxy-1-mercapto-benzene, 4-mercaptoacetophenone, 3:5-dichloro-thiosalicylic acid, mercaptobenzaldehyde, o-benzoylamino-mercaptobenzene, 1-mercaptonaphthalene, 1-cyano-2-thionaphthol, 4-mercaptodiphenylether, 9-mercaptoanthracene, 2-mercapto-benzthiazole, benzhydrylmercaptan, 2-nitro benzylmercaptan, 3-mercaptomethyl-benzonitrile, 1:2-dimercapto-ethane, 1:3-dimercapto-acetone, 1:5-dimercapto-naphthalene and dithio-hydroquinone.

As liquid media for the reaction there may be used, for example, inert organic solvents such as ether ketones, nitriles, esters, amide, aromatic and aliphatic hydrocarbons which may be halogenated or nitrated. The following are mentioned here as examples: Diethylether, benzene, toluene, xylene, acetone, ligroin, dimethylformamide, acetonitrile, ethyl acetate, chloroform, chlorobenzene, dimethylsulphoxide, carbon tetrachloride and nitrobenzene. In many cases it is also possible to use water and alcohol as reaction medium.

The reaction is carried out by bringing together the components as such or diluted with a solvent at a temperature of —50 to 180° C. preferably —20 to 130° C. When the reaction is completed, the benzoxazinones formed are usually precipitated, if necessary after concentration of the solvent by evaporation, and can thus be isolated. If at first the products of Formula III which are not yet ring closed are obtained or their salts such as the hydrochlorides, sulphates, acetates or carbonates, then they are converted into the compounds according to the invention of the Formula I by heating with a base and/or heating to temperatures up to 250° C. if desired in a high boiling solvent such as dichlorobenzene, xylene, etc.

The compounds of Formula I where Y=—$OR_6$ may also be obtained advantageously by simple molecular rearrangement with cyclization from

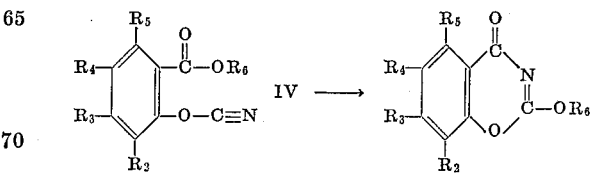

($R_2$ to $R_6$ have the meanings given above.)

This cyclizing rearrangement can be catalyzed by acids such as hydrochloric acid or acetic acid or by bases such as sodium hydroxide, alkali metal alcoholates, calcium hydroxide or tertiary amines such as triethylamine.

Preferably, tertiary amines, alkali metal hydroxides, alkaline earth hydroxides or alkali metal alcoholates are used as catalysts. When working in the temperature region of up to about 75° C. addition of catalyst is absolutely necessary. When higher temperatures are employed, cyclization in many cases taken place without a catalyst.

The compounds of Formula I with $$Y= \begin{matrix} R_7 \\ \diagup \\ \diagdown \\ R_7 \end{matrix}$$

or S—$R_8$ ($R_7$ and $R_8$ have the meaning given above), can also be obtained by reacting the benzoxazinones of Formula V, obtained by the above methods, with the above mentioned compounds of Formula HY which contain amino-, imino-, hydrazino-, hydroxylamino- or sulphhydryl groups, if desired in the form of their salts, according to the following equations:

$$V + HN\begin{matrix}R_7\\ \diagdown \\ R_8\end{matrix} \longrightarrow I\left(\text{with } Y=-N\begin{matrix}R_7\\ \diagdown \\ R_8\end{matrix}\right) + R_6OH$$

$$V + HS-R_8 \longrightarrow I\left(\text{with } Y=-S-R_8\right) + R_6OH$$

This reaction is carried out bringing together the components either as such or in dilution with one of the above mentioned solvents, at temperatures of −20 to 250° C., preferably at 0 to 200° C. The exchange is brought about or catalyzed by heating or by the addition of acids such as hydrochloric acid or acetic acid or of bases such as alkalimetal hydroxides, -alcoholates or -carbonates, or amines such as triethylamine. As a rule, no catalyst is used. The benzoxazinone derivatives usually precipitate after the reaction is finished, in some cases after concentration of the solvent by evaporation, and can thus be isolated.

The substances according to the invention are new and can be used for different purposes. They show herbicidal properties and can be used especially for the destruction of mustard in cereal-cultures. They also possess fungicidal properties and are useful for combatting undesirable fungus growth, they furthermore exhibit insecticidal properties. Added to silver chloride emulsions, these substances will increase their speed and partly act as stabilizers and fog reducing agents.

In a 0.2% solution and a total amount of 40 kg./ha. both 2 - (β - N - pentamethylene - hydrazino) - 8 - methyl - benzoxazin-(1,3)-one(4) or 2-pyrrolidino-6-chlorobenzoxazin-(1,3)-one(4) destroy any mustard completely. The latter compound also can be used in a concentration of 40 p.p.m. for combatting submersed water-plants. In the agar-test in a concentration of 100 p.p.m. it prevents any fungus growth on the treated substrate (tested fungi: *Corticium rolfsii, Verticillium alboatrum, Phytophthora cactorum, Fusarium culmorum, Fusarium oxysporum, Fusarium solani f. pisi*). Applied in a 0.2% acetone solution, 2-pyrrolidino-6-chlor-benzoxazin-(1,3)-one(4) kills *Aedes aeg.* to 100% within 3 hours after treatment.

2-hydroxylamino-benzoxazin-(1,3)-one(4) increases the speed of silver chloride emulsions if added in small amounts. Addition of 2-mercapto-benzoxazin-(1,3)-one-(4) to photographic emulsions results in the stabilization and acts as a fog reducing agent.

The other compounds of this application can be used for the same purposes.

EXAMPLE 1

A solution of 19.1 g. of ethyl-2-cyanatobenzoate, 9.4 g. of phenol and 10.1 g. of triethylamine in 130 ml. of acetone are allowed to react together for 2 hours at 30° C. The volatile constituents are removed by distillation in vacuo at 1 mm. Hg the sump temperature rising to 70° C. 2-phenoxy-benzoxazin-(1,3)-one(4) is obtained as main product from the residue by crystallization. M.P. 206 to 208° C.

*Analysis.*—Found: C, 70.07%; H, 3.98%; O, 20.08%; N, 5.95%. Calculated: C, 70.29%; H, 3.79%; O, 20.07%; N, 5.86%.

EXAMPLE 2

A mixture of 15 g. of phenyl-2-cyanatobenzoate and 15 g. of β-naphthol is reacted for 30 minutes at 175° C. The 15.9 g. of residue remaining after distilling off the phenol formed and the excess β-naphthol is 2-β-naphthoxybenzoxazin-(1:3)-one-(4).

M.P. 190–192° C.

EXAMPLE 3

By carrying out a reaction analogous to that described in Example 2, 2 - (2'-4-dichlorophenoxy)-benzoxazin-(1:3)-one-(4) is obtained in good yield from phenyl-2-cyanatobenzoate with 2:4-dichlorophenol.

M.P. 166–167° C.

EXAMPLE 4

10 g. of phenyl-2-cyanatobenzoate and 4.8 g. of 4:4'-dihydroxydiphenyl-dimethylmethane are reacted together at 160° C. in a vacuum of 5 mm. Hg with simultaneous removal by distillation of the phenol as it is formed. The compound of the formula:

[chemical structure]

is obtained in good yield: Melting point 229–232° C.

*Analysis.*—Found: C, 71.67%; H, 4.61%; O, 18.86%; N, 5.61%. Calculated: 71.81%; H, 4.27%; O, 18.51%; N, 5.40%.

The same compound can also be obtained in good yield by using 2-phenoxy-benzoxazin-(1:3)-one-(4) instead of phenyl-2-cyanatobenzoate.

EXAMPLE 5

38.2 g. of the methyl ester of 3-methyl-2-cyanatobenzoic acid are placed in a reaction vessel with 250 ml. of carbon tetrachloride and dimethylamine is passed through at −15° C. until an increase in weight of about 30 g. is obtained. The temperature increases during the reaction to +57° C.

27 g. (=61% of the theoretical) of the compound

[chemical structure]

of M.P. 223° C. are precipitated and recovered by vacuum filtration.

*Analysis.*—Calculated: C, 64.6%; H, 5.89%; N, 13.7%; O, 15.7%. Found: C, 64.35%; H, 5.93%; N, 13.80%; O, 15.85%.

EXAMPLE 6

38.3 g. of the methyl ester of 3-methyl-2-cyanatobenzoic acid are introduced, with cooling into 75 g. of diethylamine (in excess). The temperature is kept below 20° C. After stirring for ½ hour, the compound

[chemical structure]

begins to separate in the form of white crystals of M.P. 118° C. After concentrating the excess amine by evaporation, a total of 29.3 g. is obtained (=63.5% of the theoretical).

*Analysis.*—Calculated: C, 67.3%; H, 6.9%; N, 12.1%; C, 13.8%. Found: C, 67.00%; H, 6.98%; N, 11.73%; C, 13.98%.

EXAMPLE 7

4.6 g. of aniline are placed in a reaction vessel with acetone. A solution of 9.5 g. of the methyl ester of 3-methyl-2-cyanatobenzoic acid in acetone are added dropwise at room temperature and the mixture is boiled under reflux for 2 hours. The end product begins to separate when the mixture has been boiling for a short time. When the solution has cooled, the precipitated compound

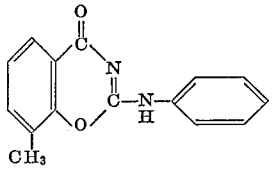

is recovered by vacuum filtration. Yield: 9 g. (=71.5% of theoretical), M.P. 224–225° C.

*Analysis.*—Calculated: C, 71.4%; H, 4.77%; N, 11.1%; O, 12.7%. Found: C, 71.20%; H, 4.99%; N, 11.15%; O, 12.03%.

EXAMPLE 8

In a manner analogous to Example 7, the compound

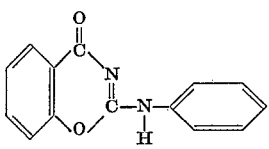

is obtained in the form of white crystals of M.P. 143–144° C. from ethyl-2-cyanatobenzoate and N-methylaniline.

EXAMPLE 9

In a manner analogous to Example 7, the compound

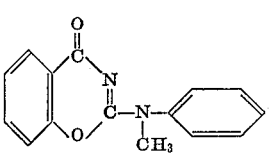

is obtained in the form of white crystals of M.P. 143–144° C. from methyl-2-cyanatobenzoate and N-methylaniline.

EXAMPLE 10

In a manner analogous to Example 7, the compound

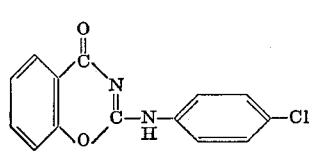

is obtained in the form of white crystals of M.P. 267–269° C. from amyl-2-cyanatobenzoate and 4-chloroaniline.

EXAMPLE 11

4.6 g. of morpholine mixed with acetone are placed in a reaction vessel and 10 g. of the methyl ester of 3-methyl-2-cyanatobenzoic acid, dissolved in acetone, are added dropwise at such a rate that the heat of reaction maintains the temperature of the mixture at 45–50° C. The compound

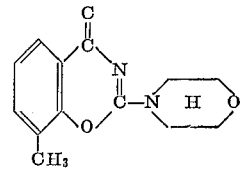

precipitates out and is isolated by vacuum filtration. Yield: 8.5 g. (=66% of theoretical, M.P. 234° C.

*Analysis.*—Calculated: C, 63.4%; H, 5.68%; N, 11.4%; O, 19.5%. Found: C, 63.27%; H, 5.88%; N, 11.41%; O, 19.74%.

EXAMPLE 12

In a manner analogous to Example 11, the compound

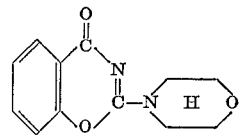

is obtained in the form of white crystals of M.P. 186–189° C. from ethyl-2-cyanato benzoate and morpholine.

EXAMPLE 13

In a manner analogous to Example 11, the compound

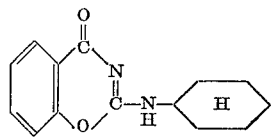

is obtained in the form of white crystals of M.P. 187–189° C. from the amyl ester 2-cyanatobenzoic acid and cyclohexylamine.

EXAMPLE 14

In a manner analogous to Example 11, the compound

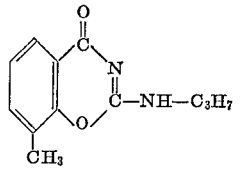

is obtained in the form of white crystals of M.P. 107–111° C. from the methylester of 3-methyl-2-cyanatobenzoic acid and n-propylamine.

EXAMPLE 15

In a manner analogous to Example 6, the compound

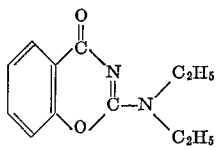

is obtained in the form of white crystals of M.P. 111–113° C. from the methyl ester of 2-cyanatobenzoic acid and diethylamine.

EXAMPLE 16

The pH of a solution of 14.8 g. of 2-aminoacetic acid in 100 ml. of water is adjusted to 7 with triethylamine. 35.8 g. of the methyl ester of 3-methyl-2-cyanatobenzoic acid are then added. The mixture is heated for 4 hours at 50° C.

A smeary residue forms which can be rendered crystalline by triturating it with acetone. After washing with water and acetone, 9 g. of the pure compound of the formula

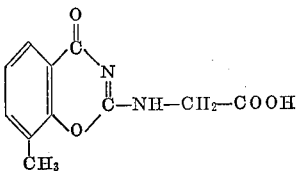

is obtained in the form of white crystals of M.P. 232° C.

*Analysis.*—Calculated: C, 56.5%; H, 4.28%; N, 11.98%; O, 27.4%. Found: C, 56.35% H, 4.56%; N, 11.61%; O, 27.46%.

EXAMPLE 17

$NH_3$ is blown into a solution of 17.7 g. of the methyl ester of 2-cyanatobenzoic acid in 70 ml. of carbon tetrachloride until the exothermic reaction is completed. The compound of the formula:

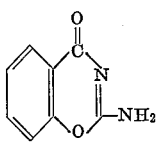

precipitates as a white crystalline powder of M.P. 266–267° C. and is recovered by vacuum filtration. Yield 13 g. (=80.5% of theoretical).

EXAMPLE 18

In a manner analogous to Example 11, the compound

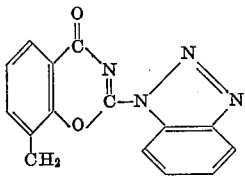

of M.P. 230° C. is obtained from the methyl ester of 2-methyl-2-cyanatobenzoic acid and benztriazole in acetone at reflux temperature.

*Analysis.*—Calculated C, 4.3%; H, 3.94%; N, 20.1%; O, 11.5%. Found: C, 63.89%; H, 3.87%; N, 20.24%; O, 11.65%.

EXAMPLE 19

(a) 50 ml. of carbon tetrachloride are poured underneath 25 g. of a 45% aqueous dimethylamine solution. 47.8 g. of the phenyl ester of 2-cyanatobenzoic acid are introduced into these liquids which are thoroughly mixed by vigorous stirring. When the strongly exothermic reaction was complete the product was stirred for another 2 hours at 40° C. and carbon tetrachloride was then evaporated off followed by water using a high vacuum. 55 g. of an oily product remained behind which slowly crystallizes completely and from which 33 g. of recrystallized compound of the formula

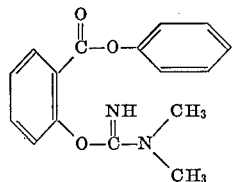

of M.P. 81–82° C. are obtained.

*Analysis.*—Calculated: C, 67.6%; H, 5.64%; N, 9.87%; O, 16.9%. Found: C, 67.26%; H, 5.78%; N, 9.89%; O, 16.97%.

(b) If the substance obtained according to (a) above is heated in benzene with the addition of triethylamine under reflux, then there is obtained the compound of the formula:

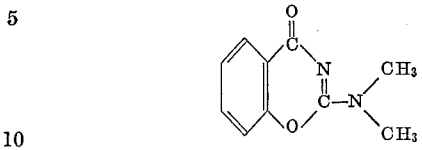

in the form of white crystals of M.P. 160° C.

*Analysis.*—Calculated: C, 63.1%; H, 4.74%; N, 14.7%; O, 16.85%. Found: C, 62.91%; H, 5.45%; N, 14.38%; O, 16.98%.

EXAMPLE 20

36.2 g. of the methyl ester of 3-methyl-2-cyanato benzoic acid dissolved in benzene are added dropwise to 13.2 g. of N:N-dimethyl-hydrazine, also dissolved in benzene. The temperature rises to 75° C. 24 g. of the compound

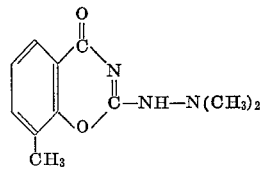

of M.P. 235° C. precipitate and are recovered by vacuum filtration. On cencentrating the filtrate by evaporation, another 5 g. of the same product are obtained. Yield: 70.5% of theoretical.

*Analysis.*—Calculated: C, 60.3%; H, 5.94%; N, 19.2%; O, 14.6%. Found: C, 59.91%; H, 5.98%; N, 19.04%; O, 14.94%.

EXAMPLE 21

20.7 g. of 3-cyanato-naphthoic acid-(2)-methyl ester are added to a solution of 8.7 g. of morpholine in 50 ml. of acetone. Considerable generation of heat occurs. 19 g. (=72% of theoretical) of the precipitated compound of the formula

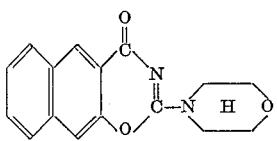

of M.P. 259–260° C. are obtained by vacuum filtration when the solution is cold.

*Analysis.*—Calculated: C, 68.0%; H, 4.96%; N, 9.93%; O, 17.05%. Found: C, 67.67%; H, 4.99%; N, 9.70%; O, 17.05%.

EXAMPLE 22

In a manner analogous to Example 21, the compound

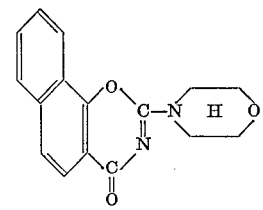

of M.P. 278° C. is obtained in the form of white crystals from 1-cyanato-naphthoic acid-(2)-methyl ester and morpholine.

*Analysis.*—Calculated: C, 68.0%; H, 4.96%; N, 9.93%; O, 17.05%. Found: C, 67.81%; H, 5.04%; N, 9.84% O, 17.22%.

EXAMPLE 23

In a manner analogous to Example 17, there is obtained, in acetone instead of carbon tetrachloride, the compound

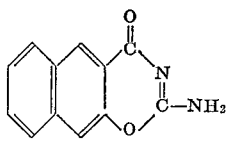

of M.P. 270–280° C. (decomposition) from 3-cyanato-naphthoic acid-(2)-methyl ester and $NH_3$.

EXAMPLE 24

10.3 g. of 3-cyanato-naphthoic acid-(2) methyl ester are suspended in 30 ml. of benzene, and 3 g. of N:N-dimethylhydrazine are introduced. The temperature of the mixture rises to 245° C., is briefly elevated to 70° C. and then cooled. By vacuum filtration of the precipitated product, 9 g. (=81.5% of theoretical) of

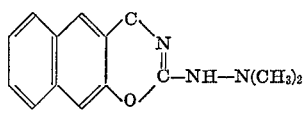

of M.P. 203–204° C., are obtained.

EXAMPLE 25

In a manner analogous to Example 20, the compound

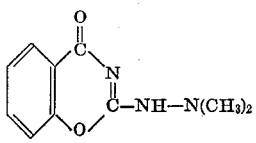

of M.P. 184-185° C. is obtained from 2-cyanatobenzoic acid ethyl ester and N:N-dimethylhydrazine.

EXAMPLE 26

In a manner analogous to Example 11, the compound

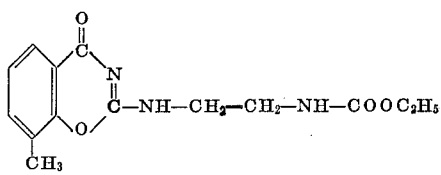

is obtained in the form of white crystals of M.P. 212–216° C. from 3-methyl-2-cyanotobenzoic acid methyl ester and $H_2N-CH_2-CH_2-NH-COOC_2H_5$.

*Analysis.*— Calculated: C, 57.7%; H, 5.84%; N, 14.42%; O, 22.0%. Found: C, 57.44%; H, 5.88%; N, 14.48%; O, 22.00%.

EXAMPLE 27

The same product is obtained as in Example 17 (2-amino-oxazinone), identified by the melting point and IR spectrum, by introducing 2-cyanatobenzoic acid into 25% aqueous ammonia and briefly heating to 50° C. to complete the reaction.

EXAMPLE 28

6 g. of $H_2N-CH_2-CH_2-N(C_2H_5)_2$ are placed in a reaction vessel with 50 ml. of benzene, and to this are added 10 g. of 3-methyl-2-cyanatobenzoic acid methyl ester dissolved in benzene. After 6 hours boiling under reflux, the precipitated compound of the formula:

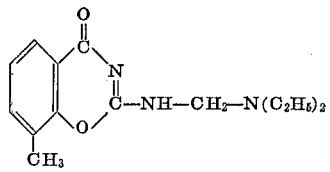

is obtained by suction filtration after cooling. M.P. 132° C. (from acetone).

Yield: 9.5 g. (=61.5% of theoretical).
*Analysis.*—Calculated: C, 65.4%; H, 7.64%; N, 15.25%; O, 11.65%. Found: C, 65.02%; H, 7.79%; N, 14.80%; O, 11.90%.

EXAMPLE 29

19.1 g. of 3-ethyl-2-cyanatobenzoic acid methyl ester are introduced portionwise, with thorough stirring, into a solution of 10.8 g. of phenylhydrazine in benzene. The temperature rises to 80° C. Stirring is continued until the temperature has dropped to 20° C. The precipitated compound of the formula:

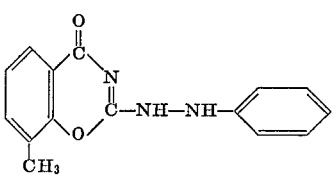

is isolated by vacuum filtration. Yield: 17 g. (=63.5% of theoretical). M.P. 230–231° C. (decomposition).

*Analysis.*—Calculated: C, 67.4%; H, 4.87%; N, 15.75%; O, 12.0%. Found: C, 67.41%; H, 5.37%; N, 15.73%; O, 11.96%.

EXAMPLE 30

In a manner analogous to Example 29, the compound

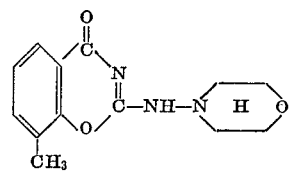

of M.P. 265–266° C. is obtained from N-aminomorpholine and 3-methyl-2-cyanatobenzoic acid methyl ester.

*Analysis.*—Calculated: C, 59.8%; H, 5.75%; N, 16.1%; O, 18.4%. Found: C, 59.11%; H, 5.95%; N, 15.9%; O, 18.85%.

EXAMPLE 31

In a manner analogous to Example 29, the compound

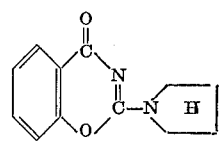

of M.P. 198–199° C. is obtained from pyrrolidone and 5-chloro-2-cyanatobenzoic acid methyl ester.

*Analysis.*—Calculated: C, 57.4%; H, 4.38%; N, 11.17%; O, 12.75%; Cl, 14.15%. Found: C, 57.17%; H, 4.62%; N, 11.25%; O, 12.87%; Cl, 13.9%.

EXAMPLE 32

In a manner analogous to Example 11, the compound

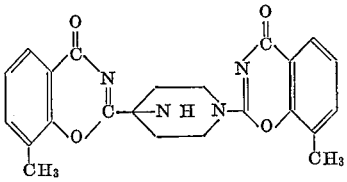

of M.P. > 300° C. is obtained from 1 mol of piperazine hexahydrate and 2 mols of 3-methyl-2-cyanato-benzoic acid methyl ester.

*Analysis.*—Calculated: C, 65.3%; H, 4.95%; N, 13.85%; O, 15.8%. Found: C, 64.43%; H, 5.44%; N, 13.87%; O, 16.08%.

EXAMPLE 33

A solution of 19.1 g. of 3-methyl-2-cyanatobenzoic acid methyl ester in 50 ml of methanol is introduced dropwise at room temperature into a methanolic solution of 7 g. of hydroxylamine hydrochloride. When the total quantity has been added, the mixture is stirred for a short time and the methanol is removed by distillation in vacuo.

A white, crystalline residue remains behind which is purified by washing with acetone and ether. Yield: 24 g. (=92% of theoretical) of the compound

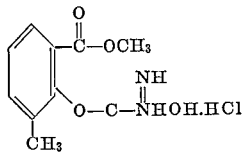

of M.P. 155° C. (decomposition).

*Analysis.*—Calculated: C, 46.2%; H, 4.9%; N, 10.75%; O, 24.6%; Cl, 13.6%. Found: C, 45.81%; H, 5.15%; N, 10.28%; O, 24.32%; Cl, 14.1%.

The hydrochloride was dissolved in water and made neutral with bicarbonate solution. The compound of the formula:

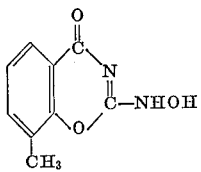

of M.P. 218–220° C. (from alcohol) then precipitates and is isolated by vacuum filtration. Yield 15 g. (=85% of theoretical based on the isolated intermediate compound).

*Analysis.*—Calculated: C, 56.3%; H, 4.18%; N, 14.53%; O, 25.0%. Found: C, 55.87%; H, 4.13%; N, 14.78%; O, 24.67%.

The IR spectrum shows a strong band at 5.9μ.

EXAMPLE 34

6.75 g. of 5-chloro-2-cyanatobenzoic acid ethyl ester in 50 ml. of methanol are placed in a reaction vessel at 20 to 25° C. A methanolic solution of 2.1 g. of hydroxyl ammonium chloride is introduced dropwise into this. After the reaction is completed, some of the methanol is removed by distillation, the reaction product is diluted with water and adjusted to neutral with NaOH.

Yield: 6 g. (=94% of theoretical) of

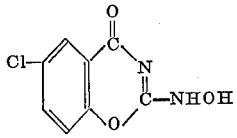

precipitate out and are isolated by vacuum filtration. M.P. 200° C. (from benzene).

The IR spectrum shows a strong band at 5.9μ like the substance from Example 1.

EXAMPLE 35

1.4 g. of hydroxylamine hydrochloride are introduced in portions at 20 to 30° C. into a suspension of 4.5 g. of 1-cyanato-naphthoic acid-(2) methyl ester in 30 ml. of methanol. All the material goes into solution. After ½ hour, the methanol is removed in vacuo, the residue is washed with ether and taken up with water. On the addition of sodium carbonate, the compound

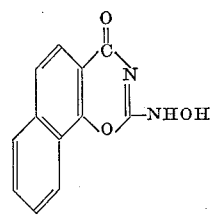

of M.P. 252° C. is precipitated. Yield: 3.0 g. (=66% of theoretical).

*Analysis.*—Calculated: C, 63.10%; H, 3.51%; N, 12.3%; O, 21.1%. Found: C, 62.94%; H, 3.68%; N, 11.98%; O, 21.58%.

The IR spectrum shows the same strong bands at 5.9 μ as the substance from Examples 33 and 34.

EXAMPLE 36

In a manner analogous to Example 35, the compound

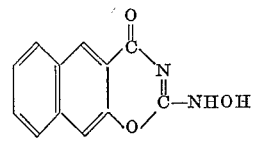

of M.P. 214° C. is obtained from 4.5 g. of 3-cyanoto-naphthoic acid-(2) methyl ester and 1.4 g. of hydroxylamine hydrochloride in methanol at 40 to 50° C. reaction temperature.

Yield: 3.2 g. (=70% of theoretical).

IR: Strong band at 5.9 μ (as in Examples 33 to 35).

EXAMPLE 37

In a manner analogous to Examples 38, the compound

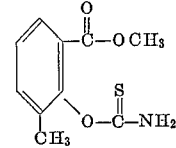

of M.P. 193° C. (decomposition) is obtained from 2-cyanato benzoic acid methyl ester and hydroxylamine hydrochloride.

*Analysis.*—Calculated: C, 54.0%; H, 3.37%; N, 15.70%; O, 26.9%. Found: C, 54.16%; H, 3.54%; N, 15.33%; O, 26.7%.

EXAMPLE 38

19.1 g. (0.1 mol) of 2-cyanato-3-methyl-benzoic acid methyl ester are dissolved in ether, 3 drops of triethylamine are added and $H_2S$ is passed into the mixture until no more is taken up. After leaving to stand overnight, the ether is distilled off, the residue, which is for the most part crystalline, is isolated by vacuum filtration and washed with petroleum ether. 17 g. (=75.52% of theoretical) of the crude compound

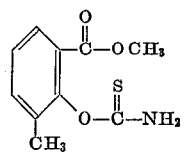

are thus obtained. After dissolving in methanol, precipitating with water, vacuum filtration and drying, the pure product of melting point 129° C. is obtained.

Analysis.—Calculated: C, 53.4%; H, 4.89%; N, 6.21%; O, 21.4%; S, 14.2%. Found: C, 53.38%; H, 4.91%; N, 6.22%; O, 21.43%; S, 14.35%.

The product so obtained is now heated for 3 hours at 130° C. in the flask and then recrystallization from benzene. The compound of the formula:

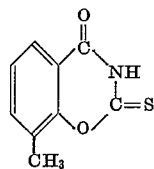

of M.P. 208° C. is thus obtained.

Analysis.—Calculated: C, 56.0%; H, 3.63%; N, 7.25%; O, 16.6%; S, 16.6%. Found: C, 55.98%; H, 3.79%; N, 7.36%; O, 17.08%; S, 16.11%.

EXAMPLE 39

4 g. (0.0226 mol) of 2-cyanato-benzoic acid methyl ester are heated to reflux in alcoholic solution and a current of $H_2S$ is passed through for 2 hours. After the addition of 3 drops of triethylamine, $H_2S$ is passed through for another hour and alcohol is then removed in vacuo.

A greenish oil remains behind from which the compound of the formula

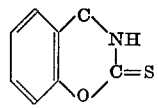

precipitates on standing. After isolation by vacuum filtration and recrystallization from alcohol, 2.1 g. (=52% of theoretical) the above ring compound of melting point 254° C. are obtained.

Analysis.—Calculated: C, 53.6%; H, 2.78%; N, 7.82%; O, 17.89%; S, 17.89%. Found: C, 53.53%; H, 2.96%; N, 7.74%; O, 18.06%; S, 17.59%.

From the filtrate and the mother liquor there are obtained a further 2 g. (=42% of theoretical) of the still non-cyclized compound of the following formula:

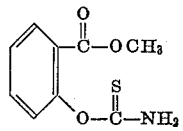

of melting point 139–141° C. (from alcohol).

Analysis.—Calculated: C, 51.2%; H, 4.26%; N, 6.64%; O, 22.7%; S, 15.2%. Found: C, 51.22%; H, 4.34%; N, 6.52%; O, 22.35%; S, 15.28%.

The latter can be converted almost quantitatively into the ring compound by heating it just above the melting point as in Example 38. On heating, methanol escapes and the residue solidifies and after recrystallization it melts at 252 to 253° C.

EXAMPLE 40

7.17 g. (0.03 mol) of 2-cyanato-benzoic acid phenyl ester are dissolved in 80 ml. of methanol which contains about 0.02 g. of sodium and treated with $H_2S$ for some hours at room temperature. The crystals of 2-thioketo-4-keto-3:4-dihydrobenzoxazine-(1:3) that have precipitated are isolated by vacuum filtration.

Yield: 4.1 g. (=76.5% of theoretical), melting point 253–254° C.

The product is identical with that obtained according to Example 39 (mixed melting point; identical IR spectra).

EXAMPLE 41

8.5 g. of 5-chloro-2-cyanato enzoic acid ethyl ester and 6 g. of acetic acid are added to 30 ml. of methanol and cooled to 0°. A solution of 12 g. of $Na_2S \cdot 9H_2O$ in 50 ml. of methanol and 35 ml. of water is now slowly added dropwise. When the addition is completed, the temperature is left to rise to 20° C. After 3 hours, the precipitated compound of the formula:

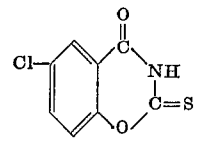

is obtained by vacuum filtration. Yield 6.0 g. (=74.5% of theoretical), melting point 245–247° (from alcohol).

Analysis.—Calculated: C, 45.0%; H, 1.88%; N, 6.55%; O, 15.0%; S, 15.0%; Cl, 16.65%. Found: C, 45.24%; H, 2.06%; N, 6.50%; O, 15.25%; S, 15.46%; Cl, 16.45%.

EXAMPLE 42

After the addition of 9 ml. of acetic acid to a suspension of 6.81 g. (0.03 ml.) of 1-cyanato-naphthoic acid methyl ester-(2) in 80 ml. of methanol and cooling to 0°, 14.4 g. of $Na_2S \cdot 9H_2O$ in water/alcohol is added dropwise. After leaving to stand overnight, the reaction mixture is boiled under reflux for 1 hour, stirred with cold water and the precipitated compound

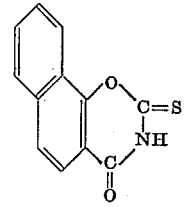

isolated by vacuum filtration. Yield 4.3 g. (=62.5% of theoretical). Melting point 263–265° C. after recrystallization from a large quantity of alcohol.

Analysis.—Calculated: C, 62.9%; H, 3.3%; N, 6.12%; O, 14.0%; S, 14.0%. Found: C, 62.53%; H, 3.19%; N, 6.17%; O, 14.67%; S, 13.81%.

EXAMPLE 43

50 g. of 2-phenoxybenzoxazin-(1:3)-one-(4) are mixed with 23 g. of aniline in 400 ml. of acetone and reacted for 20 hours at 20° C. with stirring. The crystals formed are separated by filtration and washing with acetone. 44 g. of 2-anilino-benzoxazin-(1:3)-one-(4) of melting point 217–218° C. are obtained in a state of practical analytical purity. By concentrating the solvent by evaporation, a further 2.2 g. of the same product can be obtained.

EXAMPLE 44

50 g. of 2 - phenoxybenzoxazin-(1:3)-one-(4) are reacted for 4 hours with 100 g. of N-methylaniline at 60° C. with stirring. The residue remaining behind after distilling off the phenol that is formed and the excess N-methylaniline yields 26 g. of pure 2-phenyl-methyl-amino-benzoxazin-(1:3)-one-(4) of melting point 144–145° C. on recrystallization from acetone-ligroin. By concentrating the solvent by evaporation, a further 18 g. of the same product can be obtained in a slightly less pure form from the filtrate.

*Analysis.*—Found: C, 71.46%; H, 5.00%; 12.91%; N, 11.05%. Calculated: C, 71.41%; H, 4.80%; O, 12.69%; N, 11.11%.

EXAMPLE 45

40 g. of 2-phenoxy-benzoxazine-(1:3)-one-(4) and 80 g. of p-chloroaniline are reacted together with stirring and heating for 1½ hours at 80° C. and a further 10 minutes at 165° C. By stirring with acetone and filtration, 35 g. of practically pure 2 - p-chloranilino-benzoxazin-(1:3)-one-(4) are obtained. Melting point 269–270° C.

*Analysis.*—Found: C, 61,96%; H, 3.55%; Cl, 13.00%; N, 10.10%; O, 11.93%. Calculated: 61.66%; H, 3.33%; Cl, 13.00%; N, 10.27%; O, 11.72%.

EXAMPLE 46

25 g. of 2-phenoxybenoxazin-(1:3)-one-(4) and 11 g. of morpholine in 200 ml. of acetone are recated together for 18 hours at 20° C. with stirring. The crystals formed are separated by filtration and yield, after recrystallization from acetone/carbon tetrachloride, 10 g. of pure 2-morpholinobenzoxazin - (1:3)-one-(4) of melting point 186–189° C. A further 12 g. of the same product are obtained in a less pure form by concentrating the solvent by evaporation.

*Analysis.*—Found: C, 62.27%; H, 5.43%; N, 11.94%. Calculated: C, 62.06%; H, 5.21%; N, 12.06%.

EXAMPLE 47

In a manner similar to that in Example 43, 25.2 g. of pure 2 - cyclohexylamino-benzoxazin-(1:3)-one-(4) of melting point 187–189° C. are obtained from 40 g. of 2-phenoxy-benzoxazin-(1:3)-one-(4) and 20 g. of hexahydroaniline. After concentrating the solvent by evaporation, a further 14 g. of the same product are obtained.

*Analysis.*—Found: C, 69.01%; H, 6.71%; O, 13.16%; N, 11.31%. Calculated: C, 68.83%; H, 6.60%; O, 13.10%; N, 11.47%.

EXAMPLE 48

In a manner similar to that in Example 1,2-dimethylamino-8-methyl-benzoxazin-(1:3)-one-(4) is obtained in good yield by reacting 2 - phenoxy-8-methylbenzoxazin-(1:3)-one-(4) with dimethylamine. Melting point 219° C. The values found on analysis agree with those calculated.

EXAMPLE 49

By using aniline instead of dimethylamine, 2-aniline-8-methyl-benzoxazin-(1:3)-one-(4) is obtained in accordance with Example 6. Melting point 224 to 225° C.

EXAMPLE 50

By using morpholine instead of dimethylamine, there is obtained, in accordance with Example 6, 2-morpholine-8 - methyl-benzoxazine - (1:3)-one-(4). Melting point 234° C.

EXAMPLE 51

When n-propylamine is used instead of dimethylamine, there is obtained, in accordance with Example 6, 2-(n-propylamino) - 8 - methylbenzoxazin - (1:3) - one - (4). Melting point 109 to 111° C.

EXAMPLE 52

A mixture, prepared at room temperature, of 8.9 g. of 2-phenoxy benzoxazin-(1:3)-one-(4), 3.7 g. of diethylamine and 50 ml. of benzene is distilled under normal pressure to remove benzene and in a vacuum of .1 mm. Hg, with increase of the sump temperature to 160° C. to remove the phenol formed. From the distillation residue there is obtained, after recrystallization from ligroin, 6.5 g. of 2-diethylamino-benzoxazin-(1:3)-one-(4). Melting point 111–113° C.

*Analysis.*—Found: C, 66.32%; H, 6.55%; O, 14.70%; N, 12.69%. Calculated: C, 66.03%; H, 6.47%; O, 14.66%; N, 12.84%.

EXAMPLE 53

In a manner similar to that in Example 52, 7 g. of 2-morpholino-benzoxazin-(1:3)-one-(4) which has the properties described in Example 4 are obtained from 10 g. of 2-(2':6'-dichlorophenoxy)-benzoxazin-(1:3)-one-(4) and 2.9 g. of morpholine.

EXAMPLE 54

In a manner similar to that in Example 52, 7.4 g. of 2-morpholino-benzoxazin-(1:3)-one-(4) described in Example 4 are obtained from 10 g. of 2-(β-naphthoxy)-benzoxazin-(1:3)-one-(4) and 3 g. of morpholine.

EXAMPLE 55

12 g. of 2-phenoxy-benzoxazin-(1:3)-one-(4) are reacted together with 3 g. of N:N-dimethylhydrazine for 15 minutes in 75 ml. of benzene at 30° C. with stirring. After distilling off benzene and the phenol that is formed, 9.7 g. of 2-(N-:N'-dimethyl-hydrazino)-benzoxazin-(1:3)-one-(4) are obtained. Melting point 183–185° C.

EXAMPLE 56

10 g. of 2-phenoxy-benzoxazine-(1:3)-one-(4) are boiled for one hour with 3.4 ml. of 25% aqueous ammonia in 100 ml. of benzene. After cooling and filtering, 4.7 g. of 2-amino-benzoxazin-(1:3)-one-(4) are obtained; melting point 266–267° C.

EXAMPLE 57

After boiling 5 g. of 2-phenoxy-benzoxazin-(1:3)-one-(4) and 3.4 g. of anthroanilic acid in 60 ml. of benzene for 24 hours under reflux, 5.6 g. of 2-(o-carboxyaniline)-benzoxazin-(1:3)-one-(4) of melting point 176–177° are obtained by filtration.

*Analysis.*—Found: C, 63.59%; H, 4.01%; O, 23.30%; N, 9.51%. Calculated: C, 63.83%; H, 3.57%; O, 22.67%; N, 9.93%.

EXAMPLE 58

In a manner similar to that in Example 57, the compound

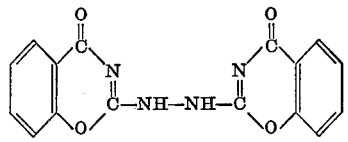

of melting point 322–324° C. is obtained from 2-phenoxy-benzoxazin-(1:3)-one-(4) with half the molar quantity of hydrazine in the form of a 17% aqueous solution.

*Analysis.*—Found: C, 59.07%; H, 2.96%; O, 20.39%; N, 18.06%. Calculated: C, 59.63%; H, 3.13%; O, 19.86%; N, 17.34%.

EXAMPLE 59

In a manner analogous to Example 43, the compound

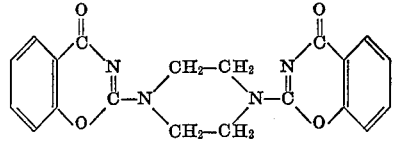

of melting point 375° (decomposition) is obtained by reacting 2-phenoxy-benzoxazin-(1:3)-one-(4) with half the molar quantity of piperazine hydrate.

EXAMPLE 60

In a manner analogous to Example 1, the compound

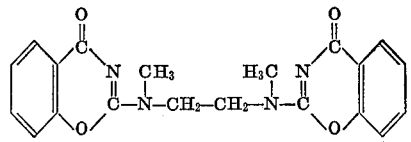

of melting point 282–285° is obtained from 2-phenoxy-benzoxazin-(1:3)-one-(4) and half the molar quantity of N:N′-dimethylethylene diamine.

EXAMPLE 61

10 g. of 2-phenoxy-benzoxazin-(1:3)-one-(4) and 5 g. of benztriazole are boiled for 30 minutes in 100 ml. of acetone. After cooling the compound of the formula

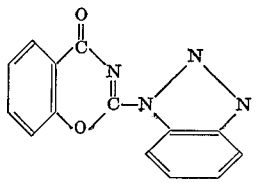

is isolated with a yield of 10.3 g. (=93% of theoretical). Melting point 261–262°.

*Analysis.*—Found: C, 62.96%; H, 3.27%; O, 12.36%; N, 21.34%. Calculated: C, 63.63%; H, 3.05%; O, 12.11%; N, 21.20%.

EXAMPLE 62

15 g. of the compound of the formula:

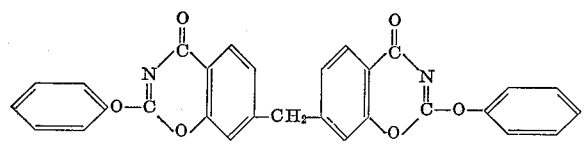

yield, after ½ hour's boiling with 5.4 g. morpholine in 150 ml. of benzene, 8 g. of the compound

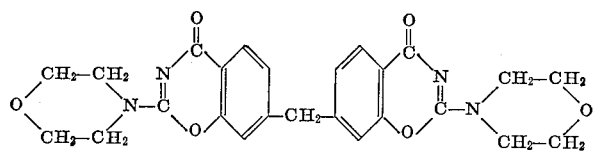

of melting point 330–335° C.

*Analysis.*—Found: C, 62.63%; H, 5.11%; O, 20.15%; N, 11.32%. Calculated: C, 63.01%; H, 5.08%; O, 20.15%; N, 11.76%.

EXAMPLE 63

After 2 g. of the compound of the formula:

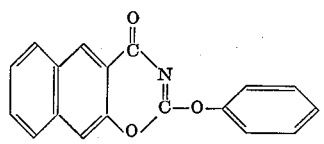

has been boiled for 2 hours with 0.6 g. of morpholine in 50 ml. of benzene, the compound of the formula:

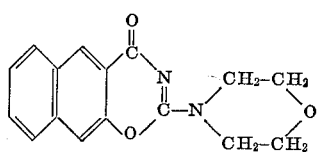

is obtained in a yield of 1.6 g. Melting point 259–260°.

EXAMPLE 64

1 g. of the compound 2-phenoxy-naphthoxazin-(1:3)-one-(4) used in Example 63 are stirred with 6.3 g. of 1% aqueous ammonia for 3 hours at 80° C. By filtration, the compound

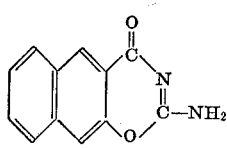

is obtained in a yield of 0.70 g. with a decomposition point above 260°.

*Analysis.*—Found: C, 68.08%; H, 3.98%; O, 15.09%; N, 13.40%. Calculated: C, 67.92%; H, 3.80%; O, 15.08%; N, 13.20%.

EXAMPLE 65

13.3 g. of 2-cyanato-carbazole-3-carboxylic acid methyl ester are suspended in 50 ml. of benzene and 4.35 g. of morpholine are then added. The temperature rises to 45° C. the mixture becomes pasty. After leaving to stand overnight, the compound

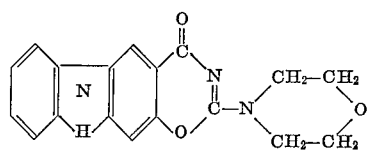

is isolated by vacuum filtration. Yield: 15 g. (=93.5% of theoretical), M.P. 341–343° C. (from dioxane)

*Analysis.*—Found: C, 67.17%; H, 5.02%; N, 12.86%; O, 15.52%. Calculated: C, 67.5%; H, 4.38%; N, 13.15%; O, 15.0%.

EXAMPLE 66

After stirring a solution of 90 g. of 2-cyanate-benzoic acid phenyl ester and 10 g. of triethylamine in 500 ml. of acetone for 16 hours at 25° C. the crystals formed are isolated by filtration and washing with acetone. 74 g. of analytically pure 2-phenoxy-benzoxazinon-(1:3)-one-(4) of melting point 206–208° C. (=82% of theoretical) are obtained.

*Analysis.*—Found: C, 70.07%; H, 3.98%; O, 20.08%; N, 5.95%. Calculated: C, 70.29%; H, 3.79%; O, 20.07%; N, 5.86%.

EXAMPLE 67

By a treatment similar to that in Example 66, 13 g. of pure 2-(2′-chlorophenoxy)-benzoxazin-(1:3)-one-(4) are obtained from 27.4 g. of 2-cyanato-benzoic acid-2-chlorophenyl ester in 130 ml. of acetone in the presence of 3 g. of triethylamine. Melting point 146–148° C.

*Analysis.*—Found: Cl, 13.00%. Calculated: Cl. 13.00%.

A further 6 g. of the same product are obtained by concentrating the solvent by evaporation.

EXAMPLE 68

In a manner similar to that in Example 66, 2-(2′-4′-dichlorophenoxy)-benzoxazin-(1:3) - one - (4) of melting point 166–167° C. is obtained from 2-cyanato-benzoic acid-2:-4-dichlorophenyl ester.

EXAMPLE 69

In a manner analogous to Examples 66, 40, 5 g. of 2-β-naphthoxy-benzoxazin-(1:3)-one-(4) of melting point 190–192° C. are obtained from 50 g. of 2-cyanato-benzoic acid-naphthyl-(2)-ester in acetone in the presence of 6 g. of triethylamine.

The yield of this product can be increased by concentrating the solvent by evaporation.

EXAMPLE 70

In a manner analogous to Example 66, 25 g. of 2-(2′:6′-dichlorophenoxy)-6-chlorobenzoxazin-(1:3) - one-(4) of melting point 228° C. are obtained from 50 g. of 2-cyanato-5-chlorobenzoic acid-2:6-dichlorophenyl ester in acetone in the presence of 7 g. of triethylamine.

*Analysis.*—Found: Cl, 30.90%. Calculated: Cl, 31.05%.

EXAMPLE 71

In a manner analogous to Example 66, 2-(2′:6′-dichlorophenoxy)-6-chloro-8-methyl - benzoxazin - (1:3)-one-(4) is obtained in good yield from 2-cyanato-3- methyl-5-chlorobenzoic acid - 2:6 - dichlorophenyl ester. Melting point 208° C.

*Analysis.*—Found: Cl, 30.00%. Calculated: Cl, 29.83%.

EXAMPLE 72

12 g. of 5:5'-methylene-bis-(2-cyanato-benzoic acid phenyl ester) and 1 g. of triethylamine are reacted together for 16 hours at 80° C. after dissolving in 50 ml. of benzene. After cooling, 7.5 g. of 6:6'-methylene-bis-(2-phenoxy)-benzoxazino-(1:3)-one-(4) are isolated from the reaction mixture by filtration. Melting point 313 to 315° C.

*Analysis.*—Found: C, 70.76%; H, 3.98%; O, 19.90%; N, 5.96%. Calculated: C, 71.01%; H, 3.70%; O, 19.57%; N, 5.71%.

EXAMPLE 73

34 g. of 2-cyanatobenzoic acid-2:6-dichlorophenyl ester are heated for 15 minutes to 200° C. The product formed by the resulting molecular rearrangement is recrystallised from carbon tetrachloride. 29 g. of 2-(2':6'-dichlorophenoxy)-benzoxazin-(1:3)-one-(4) are obtained. Melting point 180–182° C.

*Analysis.*—Found: Cl, 23.30%. Calculated: Cl, 23.01%.

EXAMPLE 74

5 g. of 2-phenoxy-benzoxazin-(1:3)-one-(4) are obtained after boiling 10 g. of 2-cyanato-benzoic acid phenyl ester in 40 ml. of acetone for 4 hours in the presence of 1.9 g. of tri-n-butylamine.

EXAMPLE 75

After ½ hour's boiling of 10 g. of 2-cyanato-benzoic acid phenyl ester in 40 ml. of benzene and passing hydrogen chloride through at the same time, 5.6 g. of 2-phenoxy-benzoxazin-(1:3)-one-(4) are obtained.

EXAMPLE 76

In the following table, the activity of various catalysts is demonstrated by giving the yield of 2-phenoxy-benzoxazin-(1:3)-one-(4) which was obtained in each case by cyclization of 10 g. of 2-cyanato-benzoic acid phenyl ester in 40 ml. of benzene at the given reaction temperatures and times.

TABLE

| Catalyst | Reaction temperature, °C. | Reaction time (hours) | Yield (g.) |
|---|---|---|---|
| 0.40 g. NaOH | 80 | 4 | |
| 0.56 g. KOH | 25 | 4 | 7.0 |
| 0.54 g. Na-methylate | 25 | 4 | 6.4 |
| 1.1 g. K-N-butylate | 80 | 4 | 3.8 |
| 0.8 g. Ca(OH)₂ | 80 | 4 | 6.7 |
| 1.73 g. Ba-hydroxide | 80 | 19 | 4.4 |
|  | 80 | 5 | 8.5 |

EXAMPLE 77

In a manner analogous to Example 66, 2-(2':6'-dichlorophenoxy) - 6 - nitro - benzoxazin - (1:3)-one-(4) of melting point 235–237° is obtained from the 2:6-dichlorophenyl ester of 5-nitro-2-cyanato-benzoic acid.

*Analysis.*—Found: C, 47.71%; H, 1.92%; Cl, 20.55%; N, 7.86%; O, 22.64%. Calculated: C, 47.62%; H, 1.71%; Cl, 20.08%; N, 7.93%; O, 22.66%.

EXAMPLE 78

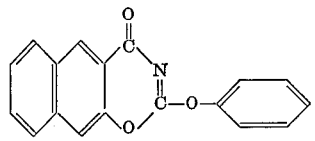

of melting point 245–247° C. is obtained in good yield by four hour's boiling of 50 g. of 2-cyanato-naphthoic acid-(3) phenyl ester and 5 g. of triethylamine in 150 ml. of benzene under reflux.

*Analysis.*—Found: C, 75.11%; H, 3.65%; N, 16.85%; O, 5.04%. Calculated: C, 74.73%; H, 3.83%; N, 16.59%; O, 4.84%.

EXAMPLE 79

A suspension of 20 g. of 2-phenoxy-benzoxazin-(1:3)-one-(4) in 100 ml. of benzene is boiled for 4 hours, with stirring, together with a hydroxylamine solution obtained by dissolving 10 g. of hydroxylamine chlorohydrate and 5.7 g. of caustic soda in 50 ml. of water. After cooling, 11.2 g. of 2-hydroxylamine-benzoxazin-(1:3)-one-(4) of melting point 202–203° (decomposition) are obtained by vacuum filtration.

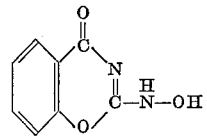

*Analysis.*—Calculated: C, 53.90%; H, 3.40%; N, 15.73%. Found: C, 54.3%; H, 3.3%; N, 16.3%.

EXAMPLE 80

In a like manner to that of Example 79, 5.2 g. of the reaction product described there are obtained from 10 g. of 2 - (2':4'-dichlorophenoxy) - benzoxazin - (1:3)-one-(4) after boiling for ¾ hour.

EXAMPLE 81

In a like manner to that in Example 79, the reaction product described there is obtained in good yield from 2 - (β-naphthoxy) - benzoxazin-(1:3)-one-(4) after boiling for ¾ hour.

EXAMPLE 82

In a like manner to that in Example 79, 2-hydroxylamine - 6 - chloro - benzoxazin - (1:3) - one - (4) of melting point 219° (decomposition) is obtained in 70% yield from 2-phenoxy-6-chloro-benzoxazin-(1:3)-one-(4) after boiling for ¾ hour.

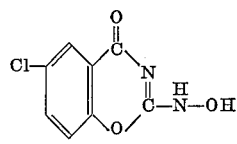

*Analysis.*—Calculated: C, 45.19%; H, 2.37%; Cl, 16.68%; N, 13.18%; O, 22.58%. Found: C, 45.49%; H, 2.82%; Cl, 16.45%; N, 12.77%; O, 23.03.

EXAMPLE 83

In a like manner to that in Example 79, an 80% yield of 2 - hydroxylamine - 8 - methyl - benzoxazin - (1:3)-one-(4) of melting point 220–221° (decomposition) is obtained from 2-phenoxy-8-methylbenzoxazin-(1:3)-one-(4) after boiling for ¾ hour.

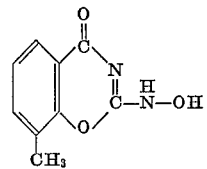

*Analysis.*—Calculated: C, 56.25%; H, 4.20%; O, 24.98%; N, 14.58%. Found: C, 56.24%; H, 4.42%; O, 25.21%; N, 14.71%.

EXAMPLE 84

In a like manner to that in Example 79, 2-hydroxylamine-4H-naphtho-[2:3-e]-1:3-oxazin-4-one of melting point 239° (decomposition) is obtained in a 95% yield from 2-phenoxy-4H-naptho-[2:3-e]-1:3-oxazin-4-one after boiling for ¾ hour.

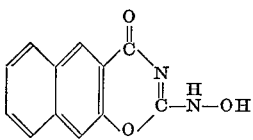

*Analysis.*—Calculated: C, 63.16%; H, 3.53%; O, 21.03%; N, 12.28%. Found: C, 63.66%; H, 3.48%; O, 21.67%; N, 11.77%.

EXAMPLE 85

5.2 g. of N-p-tolyl-hydroxylamine are added at room temperature to a suspension of 10 g. of 2-phenoxy-benzoxazin-(1:3)-one-(4) in 170 ml. of benzene. After heating to 80°, the mixture is immediately cooled. 10 g. of 2 - (N-p-tolyl-hydroxylamine) - benzoxazine - (1:3)-one-(4) of melting point 165° (decomposition) are obtained by vacuum filtration.

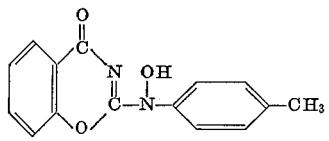

*Analysis.*—Calculated: C, 67.15%; H, 4.51%; O, 17.89%; N, 10.44%. Found: C, 67.36%; H, 4.62%; O, 18.01%; N, 10.38%.

EXAMPLE 86

In a manner analogous to Example 85 the reaction product described there is obtained in good yield from 2 - (2':4' - dichlorophenoxy)-benzoxazin-(1:3)-one-(4) after distilling off the solvent and the 2:4-dichlorophenol formed.

EXAMPLE 87

In a manner analogous to Example 84, 4 g. of the reaction product described there are obtained from 5 g. of 2-(β-naphthoxy)-benzoxazin-(1:3)-one-(4) and 2.2 g. of N-p-tolylhydroxylamine.

EXAMPLE 88

In a manner analogous to Example 85, 7.5 g. of 2-(N-p - tolyl - hydroxylamine)-6-chlorobenzoxazin-(1:3)-one-(4) of melting point 200° (decomposition) are obtained from 10 g. of 2-phenoxy-6-chloro-benzoxazine-(1:3)-one-(4) and 4.5 g. of N-p-tolyl-hydroxylamine.

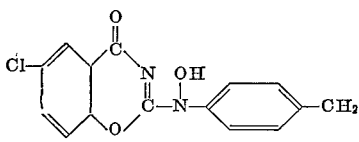

Calculated: C, 59.51%; H, 3.66%; Cl, 11.71%; N, 9.26%; O, 15.86%. Found: C, 59.85%; H, 3.97%; Cl, 10.5%; N, 9.48%; O, 15.87%.

EXAMPLE 89

10 g. of 2-phenoxy-8-methyl-benzoxazin-(1:3)-one-(4) and 4.9 g. of N-p-tolylhydroxylamine are stirred into 150 ml. of benzene for one hour at room temperature. 7.5 g. of 2-(N-p-tolyl-hydroxylamino)-8-methyl-benzoxazin-(1:3)-one-(4) of melting point 165–166° (decomposition) are obtained by vacuum filtration.

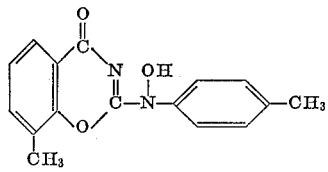

*Analysis.*—Calculated: C, 68.07%; H, 5.00%; O, 17.00%; N, 9.92%. Found: C, 68.48%; H, 5.15%; O, 17.07%; N, 9.96%.

EXAMPLE 90

After stirring 5 g. of 2-phenoxy-4H-naphtho-[2:3-e]-1:3-oxazin-4-one and 2.2 g. of N-p-tolylhydroxylamine for 4 hours at room temperature, the precipitated reaction product is isolated by vacuum filtration and the phenol contained in it is removed by distillation at 130° internal temperature and 1 mm. Hg. 4.5 g. of 2-(N-p-tolyl-hydroxylamino)-4H-naphtho-[2:3-e]-1:3-oxazin-4-one of melting point 193° (decomposition) remain behind.

Calculated: C, 71.69%; H, 4.43%; O, 15.08%; N, 8.80%. Found: C, 71.50%; H, 4.66%; O, 15.41%; N, 9.03%.

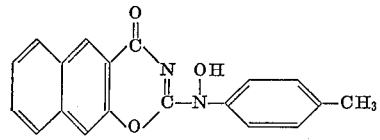

EXAMPLE 91

10 g. of 2-phenoxy-benzoxazin-(1:3)-one-(4) and 20 g. of 4-tertiary butyl-thiophenol are first heated to 170° C. and then heated within 30 minutes up to 200° C. In the process, the volatile constituents are distilled off by applying a suitable vacuum which is finally brought down 1 mm. to Hg, and 12.4 g. of 2-(p-tertiary butylphenylmercapto)-benzoxazin - (1:3) - one-(4) of melting point 105–107° C. are obtained.

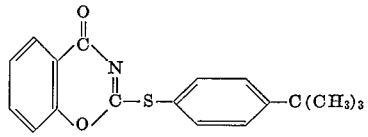

*Analysis.*—Calculated: C, 69.44%; H, 5.50%; N, 4.50%; O, 10.28%; S, 10.28%. Found: C, 69.12%; H, 5.67%; N, 4.58%; O, 10.33%; S, 10.65%.

EXAMPLE 92

In a like manner to that in Example 91, with a final vacuum of 20 mm. Hg, 11 g. of 2-(o-methylphenylmercapto)-benzoxazin-(1:3)-one-(4) of melting point 129–130° C. are obtained from 10 g. of 2-phenoxy-benzoxazin-(1:3)-one-(4) and 20 g. of 2-methyl-thiophenol.

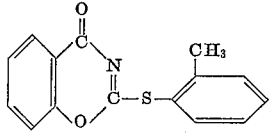

*Analysis.*—Calculated: C, 66.91%; H, 4.12%; O, 11.88%; S, 11.88%; N, 5.20%. Found: C, 66.90%; H, 4.30%; O, 12.05%; S, 11.55% N, 4.86%.

EXAMPLE 93

In a like manner to that in Example 91, with a final vacuum of 20 mm. Hg 10.5 g. of 2-phenylmercapto-benzoxazin-(1:3)-one-(4) of melting point 167–169° C. are obtained from 10 g. of 2-phenoxy-benzoxazin-(1:3)-one-(4) and 20 g. of thiophenol.

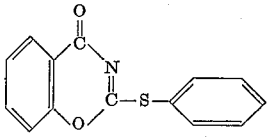

EXAMPLE 94

2 - (pentachlorophenyl - mercapto)-benzoxazin-(1:3)-one-(4) of melting point 235–236° C. is obtained in good yield from 10 g. of benzoxazin-(1:3)-one-(4) and 20 g. of pentachloro-thiophenol after heating to 250° C. and at the same time distilling off the volatile constituents in a vacuum of up to 1 mm. Hg.

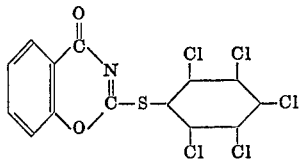

*Analysis.*—Calculated: C, 39.33%; H, 0.94%; Cl, 41.47%; N, 3.28%; O, 7.49%; S, 7.50%. Found: C, 39.47%; H, 1.24%; Cl, 41.15%; N, 3.86%; O, 7.60%; S, 7.50%.

EXAMPLE 95

In a manner analogous to Example 91 7.1 g. of 2-n-dodecylmercapto - benzoxazin-(1:3)-one-(4) of melting point 58.5 to 59.5° are obtained from 5 g. of 2-phenoxy-benzoxazin-(1:3)-one-(4) and 10 g. of n-dodecylmercaptan.

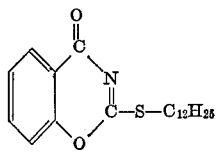

*Analysis.*—Calculated: C, 69.13%; H, 8.41%; O, 9.21%; S, 9.21%; N, 4.03%. Found: C, 68.78%; H, 8.38%; O, 9.55%; S, 9.20%; N, 4.20%.

EXAMPLE 96

By a treatment similar to that in Example 91, the 2-(p-tertiary butylphenyl-mercapto) - benzoxazin-(1:3)-one-(4) is obtained in good yield from 5 g. each of 2:6-dichlorophenoxy-benzoxazin-(1:3)-one-(4) and p-tertiarybutyl thiophenol.

EXAMPLE 97

5 g. each of 2-(β-naphthoxy)-benzoxazin-(1:3)-one-(4) and p-tertiary butyl thiophenol produce, in a manner analogous to Example 91, after heating to 220° C. under a vacuum of finally 2 mm. Hg, a good yield of the reaction product described in Example 91.

EXAMPLE 98

By a treatment similar to that in Example 91, 5 g. of (2-o-methylphenyl-marcapto) - 8 - methyl-benzoxazin-(1:3)-one-(4) of melting point 123–125° C. are obtained from 5 g. each of 2-phenoxy-8-methyl-benzoxazin-(1:3)-one-(4) and 2-methyl-thiophenol.

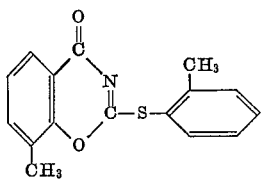

*Analysis.*—Calculated: C, 57.84%; H, 4.63%; O, 11.29%; S, 11.30; N, 4.95%. Found: C, 68.06%; H, 4.77%; O, 11.37%; S, 11.50%; N, 4.99%.

EXAMPLE 99

5 g. each of 2-phenoxy-6-chloro-benzoxazin-(1:3)-one-(4) and 2-methyl-thiophenol yield, after a treatment similar to that in Example 1, 14.5 g. of 2-o-methylphenyl-mercapto)-6-chloro-benzoxazin-(1:3)-one-(4) of melting point 153–155° C.

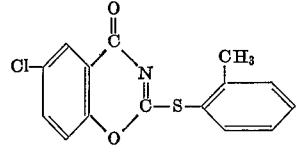

*Analysis.*—Calculated: C, 59.31%; H, 3.32%; Cl, 11.67%; N, 4.61%; O, 10.53%; S, 10.55%. Found: C, 59.52%; H, 3.35%; Cl, 11.85%; N, 4.63%; O, 10.53%; S, 10.89%.

EXAMPLE 100

By a treatment similar to that in Example 91, 2-(o-methylphenylmercapto) - 4H - naphtho[2:3-e]-1:3-oxazin-4-one (M.P. 184–185° C.) is obtained in good yield from 10 g. of 2-phenoxy-4H-naphtho-[2:3-e]-1:3-oxazin-4-one and 15 g. of 2-methyl thiophenol.

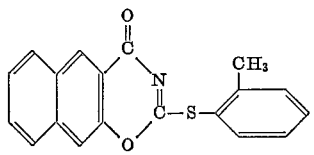

*Analysis.*—Calculated: C, 71.47%; H, 4.10%; O, 10.02%; S, 10.02%; N, 4.39%. Found: C, 71.44%; H, 4.28%; O, 10.42%; S, 9.5%; N, 4.82%.

EXAMPLE 101

After heating 10 g. of 6:6'-methylene-bis-(2-phenoxy-benzoxazin-(1:3)-one-(4) and 10 g. of o-thiocresol to 220° C., all volatile constituents are distilled off in a vacuum of 2 mm. Hg and with increase of temperature to 250° C. and 10 g. of 6:6-methylene-bis-(o-methylphenylmercapto - benzoxazin-(1:3)-one-(4) of melting point 286° are obtained.

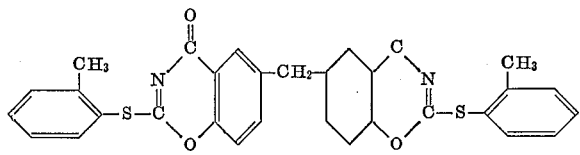

*Analysis.*—Calculated: C, 67.63%; H, 4.03%; N, 5.09%; O, 11.62%; S, 11.63%. Found: C, 67.26%; H, 4.26%; N, 5.37%; O, 12.40%; S, 11.05%.

EXAMPLE 102

Hydrogen sulphide is passed for 2 hours through a solution of 10 g. of 2-phenoxy-benzoxazin-(1:3)-one-(4) in 100 ml. Decalin at 180°. After cooling, 6 g. of 2-mercapto - benzoxazin-(1:3)-one-(4) of melting point 253–255° C. are obtained by vacuum filtration.

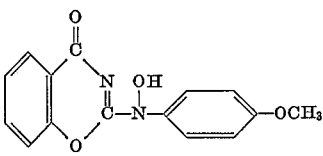

EXAMPLE 103

5.31 g. (0.03 mol) 2-cyanato-benzoic-acid-methyl-ester are stirred into 4.17 g. (0.03 mol) 4-methoxyphenyl-hydroxylamine in 60 ml. ether at 0° C. After stirring for further 30 minutes the separated is isolated by suction.

Melting point 143 to 144° C. (decomposition) (recrystallized from methanol).

Yield: 8.0 g. (94% of the theory).

Analysis.—Calculated: C, 63.5%; H, 4.22%; N, 9.85%; O, 22.6%. Found: C, 63.72%; H, 4.39%; N, 9.61%; O, 22.55%.

We claim:

1. 1,3-benzoxazine-(4)-one of the formula:

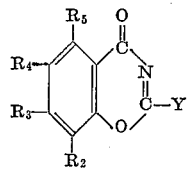

wherein $R_2$, $R_3$, $R_4$ and $R_5$ each represents a member selected from the group consisting of hydrogen, lower alkyl, halogen, methoxy, $NO_2$, 2'-morpholino-7'-methylene benzoxazine-(1,3)-one-(4), 2-phenoxy-6-methylene-benzoxazine-(1,3)-one-(4), and o-methyl-phenyl-mercapto-6-methylene-benzoxazine-(1,3)-one-(4) and wherein any 2 of $R_2$–$R_5$ taken together form naphtyl, and Y is a member selected from the group consisting of phenoxy, naphthoxy, halophenoxy, lower alkoxyphenoxy, amino, cyclohexylamino, lower alkylamino, anilino, chloranilino, lower alkylanilino, nitroanilino, carboxyanilino, diloweralkylamino, phenyl lower alkylamino, pyrrolidino, piperidino, morpholino, piperazino, benztriazolo, N-aminomorpholino, N-aminopiperidino, amino-loweralkylamino, amino-phenylamino, hydroxylamino, lower alkylhydroxylamino, phenylhydroxylamino, naphtylhydroxylamino, lower alkoxyphenylhydroxylamino, lower alkylphenylhydroxylamino, halophenylhydroxylamino, nitrophenylhydroxlamino, hydrazino, lower alkylhydrazino, phenylhydrazino, halophenylhydrazino, lower alkylphenylhydrazino, nitrophenylhydrazino, N-amino-carbozolyl, 4-hydrazinopyridino, hydroxyquinonyl, chlor substituted hydroxyquinolyl, 2,3-dihydroxyquinoxalyl, hydroxyquinolyl, 1,5-dihydroxynaphtyl, 4,4'-(prop-2-yl)-bis-(phenoxy), mercapto, N-dodecylmercapto, carboxymethylamino, diethylaminomethylamino, and carboxyaminoethylamino.

2. A 1,3-benzoxazine-(4)-one according to claim 1 designated 2-phenoxyl-1,3-benzoaxazine-(4)-one.

3. A 1,3-benzoxazine-(4)-one according to claim 1 designated 2-dimethylamino-1,3-benzoxazine-(4)-one.

4. A 1,3-benzoxazine-(4)-one according to claim 1 designated 2-morpholino-1,3-benzoxazine-(4)-one.

5. A 1,3-benzoxazine-(4)-one according to claim 1 designated 2-anilino-8-methyl-1,3-benzoxazine-(4)-one.

6. A 1,3-benzoxazine-(4)-one according to claim 1 designated 7,7'-methylene-bis-(2 - phenoxy)1,3 - benzoxazine-(4)-one.

7. A 1,3-benzoxazine-(4)-one according to claim 1 designated 2-benztriazolyl-1,3-benzoaxazine-(4)-one.

8. A 1,3-benzoxazine-(4)-one according to claim 1 designated 2-mercapto-6-chlor-1,3-benzoxazine-(4)-one.

9. A 1,3-benzoxazine-(4)-one according to claim 1 designated 2-hydroxylamino-6,7 - benz - 1,3 - benzoxazine-(4)-one.

10. A 1,3-benzoxazine-(4)-one according to claim 1 designated 2 - β,β - dimethylhydrazino - 1,3 - benzoxazine-(4)-one.

11. A 1,3-benzoxazine-(4)-one according to claim 1 designated 2-dodecylmercapto-1,3-benzoxazine-(4)-one.

12. A 1,3-benzoxazine-(4)-one according to claim 1 designated 2-(4'-methoxyphenylhydroxylamino)-1,3-benzoxazine-(4)-one.

13. A process for the preparation of benzoxazine-(4)-ones, substituted in the 2-position, which comprises reacting a cyanic acid ester of the formula:

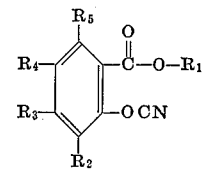

wherein $R_1$ represents a member selected from the group consisting of hydrogen, lower alkyl, phenyl, chlor substituted phenyl and naphthyl, and $R_2$, $R_3$, $R_4$ and $R_5$ each represents a member selected from the group consisting of hydrogen, lower alkyl, halogen, methoxy, $NO_2$, 2'- morpholine - 7'- methylene benzoxazine-(1,3)-one-(4), 2-phenoxy-6-methylene-benzoxazine-(1,3)-one(4), and o-methylphenylmercapto - 6 - methylene-benzoxazine-(1,3)-one-(4) and wherein any two of $R_2$–$R_5$ taken together form naphthyl with a compound of the formula HY containing a reactive hydrogen atom wherein Y is a member selected from the group consisting of phenoxy, naphthoxy, halophenoxy, lower alkoxyphenoxy, amino, cyclohexylamino, lower alkylamino, anilino, chloranilino, lower alkyl anilino, nitroanilino, carboxyanilino, diloweralkylamino, phenyl lower alkylamino, pyrrolidino, piperidino, morpholino, piperazino, benztriazolo, N-amino-morpholino, N-aminopiperidino, amino-loweralkylamino, aminophenylamino, hydroxylamino, lower alkylhydroxylamino, phenylhydroxylamino, naphthylhydroxylamino, lower alkoxyphenylhydroxylamino, lower alkylphenylhydroxylamino, halophenylhydroxylamino, nitrophenylhydroxylamino, hydrazino, lower alkyl hydrazino, phenylhydrazino, halophenylhydrazino, lower alkylphenylhydrazino, nitrophenylhydrazino, N-amino-carbozolyl, 4-hydrazinopyridino, hydroxyquinolyl, chlor substituted hydroxyquinolyl, 2,3-dihydroxyquinoxalyl, hydroquinonyl, 1,5-dihydroxynaphthyl, 4,4'-(prop-2-yl)-bis-(phenoxy), mercapto, N-dodecylmercapto, carboxymethylamino, diethylaminomethylamino, and carboxyaminoethylamino.

14. Process according to claim 13 wherein the compound of the formula HY being a salt selected from the group consisting of an ammonium-, alkali metal- and an alkaline earth metal salt.

15. Process according to claim 13 wherein the compound being a salt of an acid selected from the group consisting of an hydrochloric acid, sufuric acid, nitric acid, acetic acid and carbondioxide.

16. Process according to claim 13 wherein said liquid medium is an organic solvent.

17. Process according to claim 13 wherein said liquid medium is water.

18. A process for the production of 1,3-benzoxazine-(4)-ones according to claim 13 which comprises heating to a temperature of about −20 to about 250° C. an o-cyanato-carboxylic acid ester in the presence of a base selected from the group consisting of alkali metal-hydroxides, -carbonates, -alcoholates and tertiary amines, reacting the formed 2-aroxyl-1,3-benzoxazine-(4)-one with a compound HY where Y has the meaning given above, having a reactive hydrogen atom, said reacting being carried out at temperatures of about −20 to about 250° C. and recovering from the reaction mixture the formed 1,3-benzoxazine-(4)-one.

References Cited

FOREIGN PATENTS 6,412,966   5/1965   Netherlands.

HENRY R. JILES, Primary Examiner

R. T. BOND, Assistant Examiner

U.S. Cl. X.R.

71—82; 96—102, 107, 109; 424—248

UNITED STATES PATENT OFFICE
CERTIFICATE OF CORRECTION

Patent No. 3,491,092     Dated January 20, 1970

Inventor(s) Ernst Grigat, et al.     PAGE - 1

It is certified that error appears in the above-identified patent and that said Letters Patent are hereby corrected as shown below:

1. Column 1, line 46, "arylmeracpto" should be --arylmercapto--.

2. Column 3, line 12, "benzendicarboxylic" should be --benzenedicarboxylic--.

3. Column 3, line 18, "2-cyanatonaphthoic" should be --2-cyanato-naphtoic--.

4. Column 4, line 25, "lycol" should be --glycol--.

5. Column 5, line 10, "$Y=\begin{smallmatrix}R_7\\R_7\end{smallmatrix}$" should be --$Y = N\begin{smallmatrix}R_7\\R_8\end{smallmatrix}$--.

6. Column 9, line 48, "C, 4.3%" should be --C, 64.3%--.

7. Column 14, line 44, "cyanoto" should be --cyanato--.

8. Column 15, line 17, "recrystallization" should be --recrystallized--.

9. Column 16, line 10, "5-chloro-2-cyanato enzoic" should be --5-chloro-2-cyanatobenzoic--.

PO-1050
(5/69)

UNITED STATES PATENT OFFICE
CERTIFICATE OF CORRECTION

Patent No. __3,491,092__     Dated __January 20, 1970__

Inventor(s)__Ernst Grigat, et al.__     PAGE - 2

It is certified that error appears in the above-identified patent and that said Letters Patent are hereby corrected as shown below:

10. Column 23, line 55,

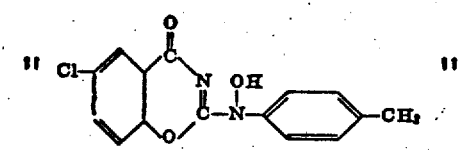

should be:

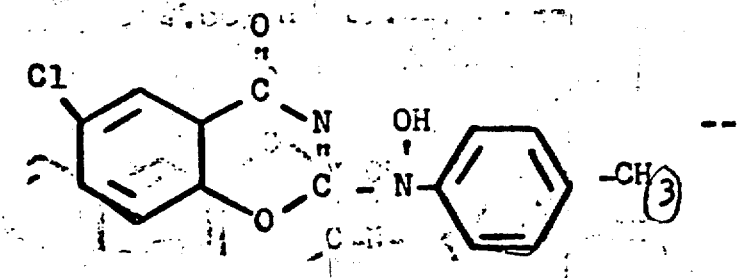

("CH$_2$" should be --CH$_3$--.)

PO-1050
(5/69)

UNITED STATES PATENT OFFICE
CERTIFICATE OF CORRECTION

Patent No. 3,491,092  Dated January 20, 1970

Inventor(s) Ernst Grigat, et al.  PAGE - 3

It is certified that error appears in the above-identified patent and that said Letters Patent are hereby corrected as shown below:

11. Column 25, line 53, "2-o-methylphenyl-marcapto" should be --2-o-methylphenyl-mercapto--.

12. Column 25, line 68, "C,57.84%" should be --C, 67.84%--.

13. Column 25, line 75, "14.5" should be --14.6--.

14. Column 25, line 75, "2-o" should be --2-(o --.

15. Column 27, line 61 "benzoaxazine" should be --benzoxazine--.

16. Column 28, line 36, "hydroquinonyl" should be --hydroxyquinonyl--.

SIGNED AND
SEALED
JUN 30 1970

(SEAL)
Attest:

Edward M. Fletcher, Jr.
Attesting Officer

WILLIAM E. SCHUYLER, JR.
Commissioner of Patents